(12) United States Patent
Mougeat et al.

(10) Patent No.: US 6,236,683 B1
(45) Date of Patent: May 22, 2001

(54) IMAGE PREDICTOR

(75) Inventors: Paul Mougeat, Sassenage; Michel Harrand, Seyssinet Pariset, both of (FR)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 08/385,074

(22) Filed: Feb. 7, 1995

Related U.S. Application Data (63) Continuation of application No. 07/931,827, filed on Aug. 18, 1992, now abandoned.

(30) Foreign Application Priority Data

Aug. 21, 1991 (FR) .................................................. 91 10753

(51) Int. Cl.$^7$ ....................................................... H04N 7/32
(52) U.S. Cl. ................ 375/240.16; 348/714; 375/240.24
(58) Field of Search .................................. 348/413, 416, 348/699, 384, 390, 400–402, 407, 409–412, 714, 718; 382/30, 34, 232, 234, 236, 238; 375/240.01, 240.12–240.16, 240.24; H04N 7/137, 7/32

(56) References Cited

U.S. PATENT DOCUMENTS

| | | | |
|---|---|---|---|
| 4,435,835 | * | 3/1984 | Sakow et al. ............................ 382/34 |
| 4,460,923 | * | 7/1984 | Hirano et al. .......................... 358/136 |
| 4,821,119 | * | 4/1989 | Gharavi .................................. 358/136 |
| 4,984,070 | * | 1/1991 | Tanoka et al. ........................ 358/105 |
| 5,142,360 | * | 8/1992 | Niihara .................................. 358/105 |
| 5,153,720 | * | 10/1992 | Kawai .................................... 358/105 |
| 5,162,907 | * | 11/1992 | Keating et al. ........................ 358/105 |
| 5,181,229 | * | 1/1993 | Langlais et al. ...................... 358/133 |
| 5,208,667 | * | 5/1993 | Saunders ............................... 358/105 |
| 5,210,605 | * | 5/1993 | Zaccarin et al. ...................... 358/105 |

FOREIGN PATENT DOCUMENTS

| | | | |
|---|---|---|---|
| 0363677 | 9/1989 | (EP) . | |
| 0363677 | 4/1990 | (EP) | ................................ G06F/15/70 |

OTHER PUBLICATIONS

"IEEE Transactions on Circuits and Systems", vol. 36, No. 10, Oct. 1989, New York, pp. 1267–1274.
"Signal Processing of HDTV, II", Proceedings of the Third International Workshop on HDTV), Aug. 1989, Turin, Italy, pp. 273–283.

* cited by examiner

Primary Examiner—Richard Lee
(74) Attorney, Agent, or Firm—Wolf, Greenfield & Sacks, P.C.; James H. Morris; Theodore E. Galanthay (57) ABSTRACT

A predictor provides as a pixel block of a current image a set of p target pixels of the preceding image so that each target pixel corresponds in the image to the adjacent pixels of the current pixel shifted by a predetermined motion vector. The predictor includes a search memory, each cell of which is independently addressable in read/write mode; three write decoders for simultaneously addressing in write mode three cells of three portions of the memory; p read decoders for simultaneously addressing in read mode p cells of p distinct sub-portions of the memory; and for controlling the write decoders so that p successive writings of data of the same nature corresponding to p adjacent points in the image are achieved in each of the p sub-portions.

36 Claims, 5 Drawing Sheets

IMAGE PREDICTOR

This application is a continuation of application Ser. No. 07/931,827, filed Aug. 18, 1992, entitled Image Predictor, now abandoned.

BACKGROUND OF THE INVENTION

The present invention relates to the field of digital image processing.

The sophistication and increased definition of displayed images, especially for high definition TV, has led to the development of various systems to, during transmission of moving images, transmit only a portion of these images, namely only the portion of the images which changes from one image to another.

Figure 1:
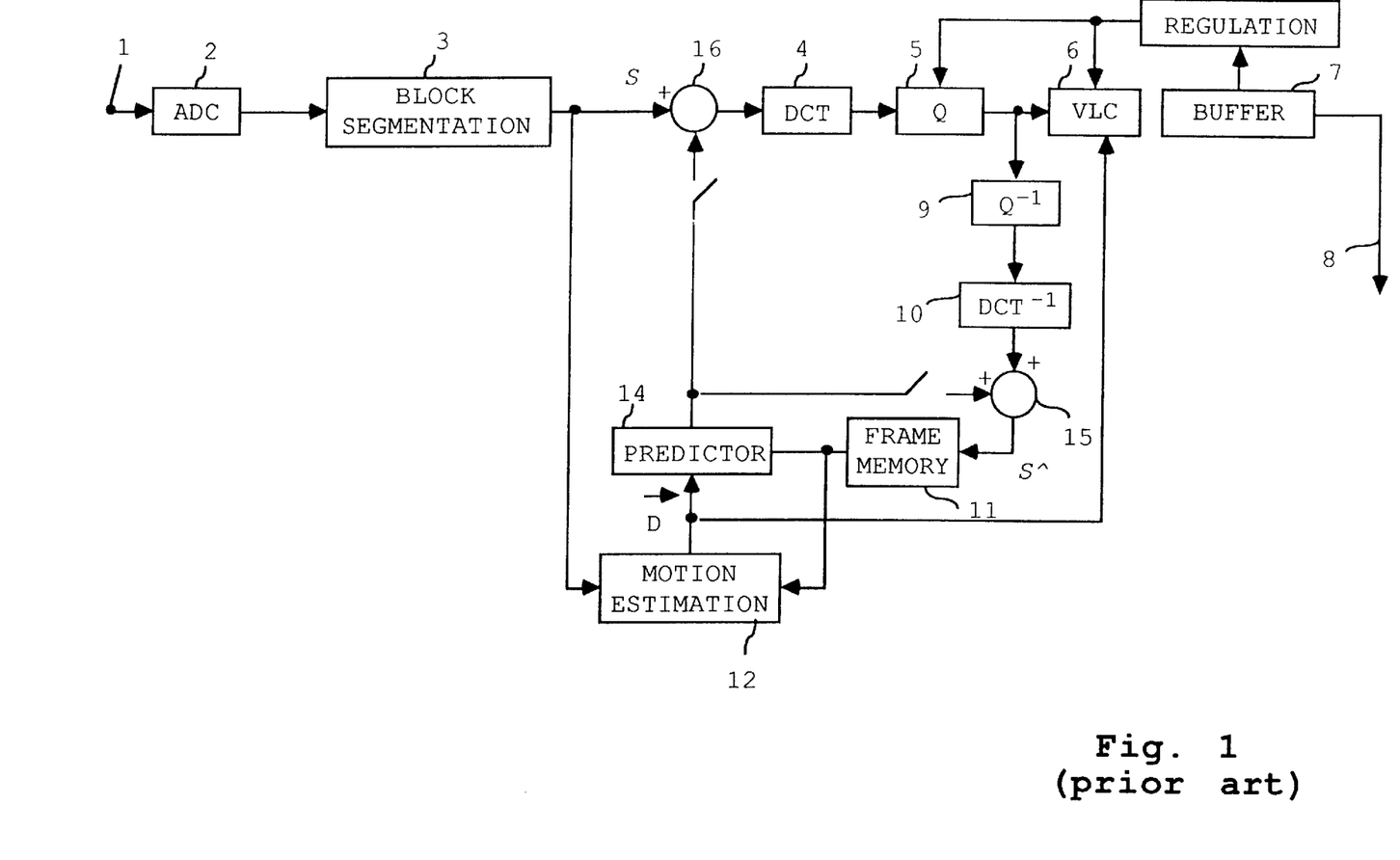
FIG. 1 shows an exemplary prior art encoder that can incorporate a predictor according to the invention.

FIG. 1 shows as exemplary general arrangement of a conventional TV image encoder. The encoder comprises a video signal input 1, an analog-digital converter (ADC) 2, a scanning system 3 for scanning images in blocks, a device for calculating the discrete cosine transform (DCT) 4, a quantification system (Q) 5, a varying length coding system (VLC) 6, and a buffer memory 7, the output of which is provided through a line 8 to the transmission channel or to an intermediate storing device (not shown). With the use of the cosine transform, the amount of information to be transmitted is reduced. In addition, a unit for comparing the current image with the previous image is provided. This system comprises devices for calculating reverse quantification ($Q^{-1}$) 9 and reverse cosine transform ($DCT^{-1}$) 10, the results of which are provided to a frame memory 11. Frame memory 11 contains, at a given time, the image preceding the current image. The content of this frame memory is compared by blocks to the content of the current image in a motion estimator 12. Motion estimator 12 seeks, for each current image block, the portion of the preceding image most resembling the current image block. This most resembling portion is called the target portion and the distance between the current image block of interest and this target portion is called motion vector D. This vector constitutes a first input of a predictor 14 which also receives the preceding frame from frame memory 11. The predictor output is sent back by an adder 15 into frame memory 11. A subtracter 16 subtracts, from current image information, the information of the preceding image output from the frame memory and shifted by the predictor, block after block. The output of subtracter 16 is provided to the DCT calculating device 4. Thus, at output 8 of the encoding system, one obtains a reduced amount of information, because the information has been subjected to two processings; the process for comparison with the preceding image and the cosine transform and quantification process. Hence, the bandwidth of the transmission channels is substantially decreased because less information needs to be transmitted.

Figure 2:
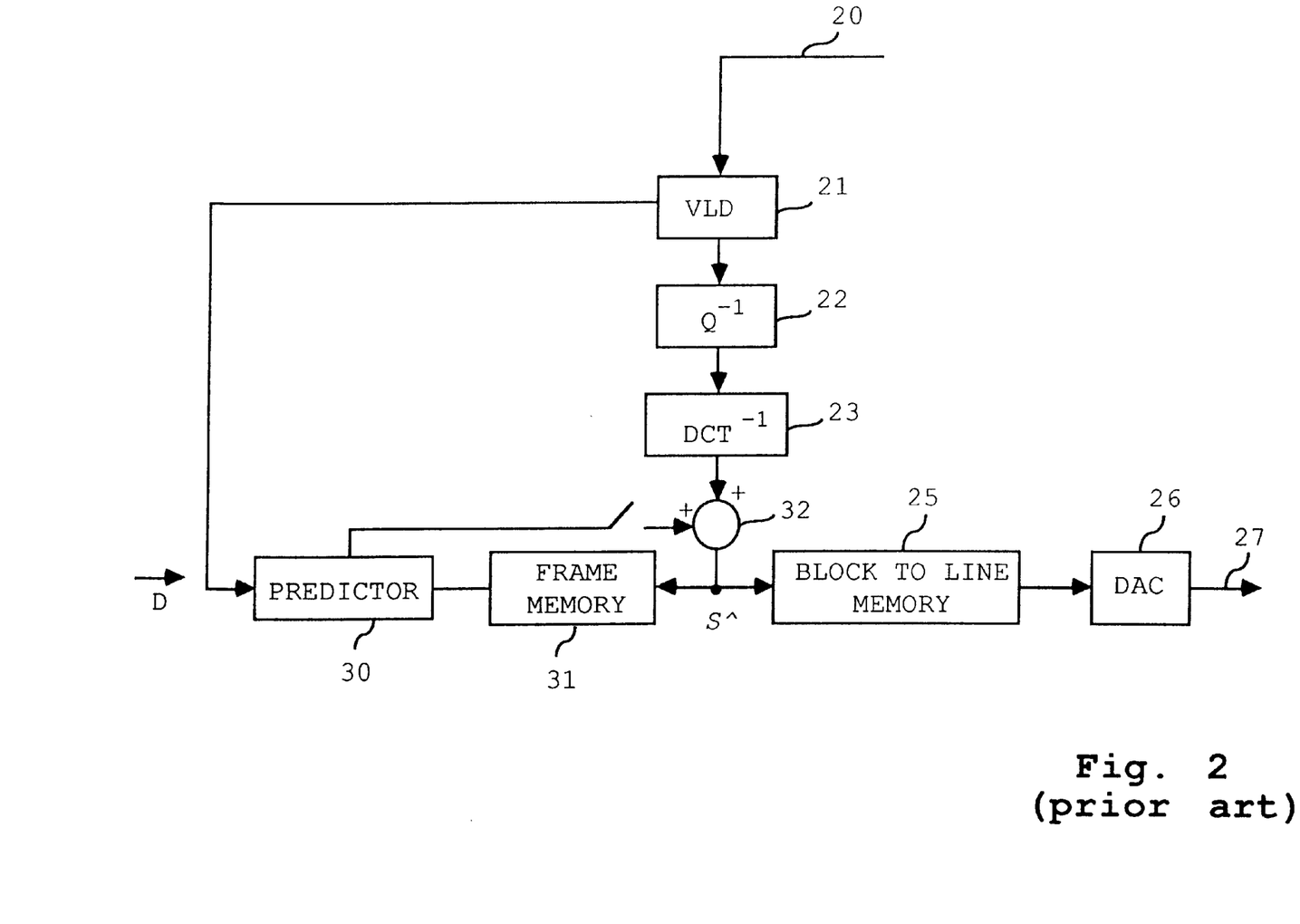
FIG. 2 shows an exemplary prior art decoder that can incorporate a predictor according to the invention.

FIG. 2 shows a decoder associated with the encoder of FIG. 1. The decoder receives at its input 20 a signal corresponding to the transmitted signal 8. This signal is processed by a variable length decoder (VLD) 21, a system for calculating the reverse quantification 22, and a system for calculating the reverse cosine transform 23. The output of the system for calculating the reverse cosine transform is provided to a block to line scanning converter 25, then to a digital/analog converter (DAC) 26 to provide a video signal 27 suitable, for example, to control a TV display system (not shown). In addition, the VLD system provides the motion vector D to a predictor 30, which also receives the output of a frame memory 31. The predictor output signal is added to the output of the circuit calculating the reverse cosine transform by an adder 32. The output of adder 32 is provided, on the one hand, to the frame memory 31 and, on the other hand, to the scanning converter 25.

The above description is intended only to exemplify an environment in which the invention can be applied. The invention specifically relates to the predictor 14 or 30 of the encoder or decoder; these predictors are of course identical, but for the sake of simplicity, the invention will be disclosed only in connection with the decoding circuit.

Up to now, the known predictors have been complex systems occupying a whole printed circuit board on which are arranged numerous components and especially numerous memories between which numerous interconnections are provided.

SUMMARY OF THE INVENTION

An object of the invention is to provide a predictor architecture which can be implemented in a single monolithic integrated circuit.

This object and other objects of the invention are achieved by providing a predictor intended to supply, in the form of a pixel block, an assembly of p target pixels of the preceding image so that each target pixel corresponds in the image to the adjacent pixels of the current pixel shifted by a predetermined motion vector. This predictor comprises a search memory having the size of a current column increased by maximum motions liable to be provided by the motion vector, each cell of this memory being independently addressable in read/write modes; three write decoders for simultaneously addressing in write mode three cells of three portions of the memory; p read decoders for simultaneously addressing in read mode p cells of p distinct sub-portions from the memory; and means for controlling the write decoders so that p successive write steps of data of the same nature corresponding to p adjacent points in the image are achieved in each p sub-portion.

BRIEF DESCRIPTION OF THE DRAWINGS

The foregoing and other objects, features and advantages of the invention will be apparent from the following detailed description of a preferred embodiment as illustrated in the accompanying drawings wherein.

DETAILED DESCRIPTION OF THE INVENTION

Figure 3:
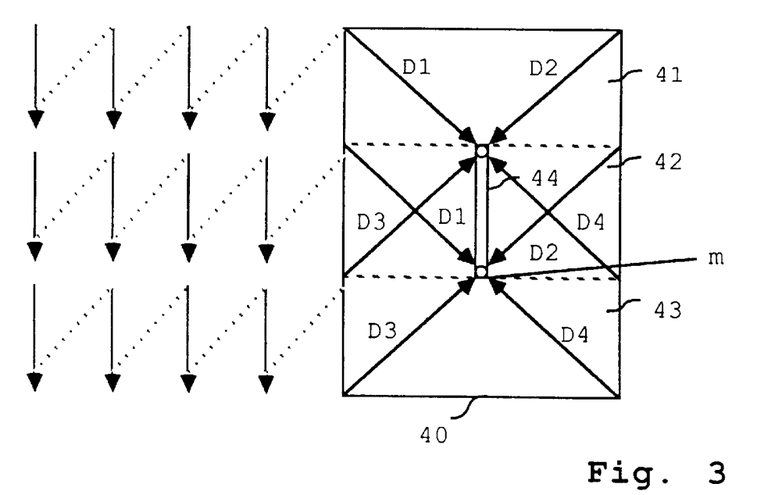
FIG. 3 schematically illustrates the operation mode of a predictor according to the invention.

FIG. 3 symbolically represents a search memory 40 of a predictor according to the invention. Actually, it is a single memory, but for purposes of simplifying the explanation only, it will be considered that this memory is divided into three blocks 41, 42, 43. It should be remembered that the whole architecture incorporating the predictor according to the invention is an architecture in which block scanning is already provided, that is, each block 41, 42 and 43 is filled by beginning with the upper left cell, then going down along a column and then each column is shifted to the right.

For purposes of explanation, the current image pixels are assumed to be found in the middle column of the middle block 42, represented by a vertical rectangle 44. These pixels are searched. Thus, it is necessary to determine the value that must be given to points 0 to m of this column for a given motion vector D.

FIG. 3 shows, by way of example, four motion vectors D1, D2, D3, D4 corresponding to the possible extreme values of the motion vector. Thus, if the motion vector is vector D1, the value of point 0 in the current column must correspond to the value stored in the upper left cell of block 41. For vector D2, this will be the value stored in the upper right cell of block 41; and for value D4, the value stored in the lower right cell of block 42. Similarly, vectors D1, D2, D3, D4 associated with the lower point m of column 44 are represented. It can be seen that, for point 0 of column 44, the value to be searched in the memory is a value appearing in one of blocks 41 or 42 and, for point m of column 44, the value to be searched appears in one of blocks 42 or 43. Thus, by transferring (by block scanning) the data from the frame memory into the search memory 40 of FIG. 3, the searched value corresponding to the motion vector will be in this memory at any time.

Various read and write coding systems can be devised, knowing the accurate value of the motion vector, to provide at the output, at any time, the point in memory 40 shifted by the motion vector with respect to the current point.

In practice, the problem is more complicated because, in order to improve the resolution of the system, it is noted that the motion vector has not necessarily an integer value exactly providing a pixel from one image to another. Thus, generally, the motion vector leads to a target point intermediate between adjacent pixels. It has then been proposed to provide at the output for each point, instead of the nearest pixel to the one provided by the motion vector, the sum of the four adjacent pixels of this target and then to achieve an interpolation, for example a linear interpolation.

Figure 4:
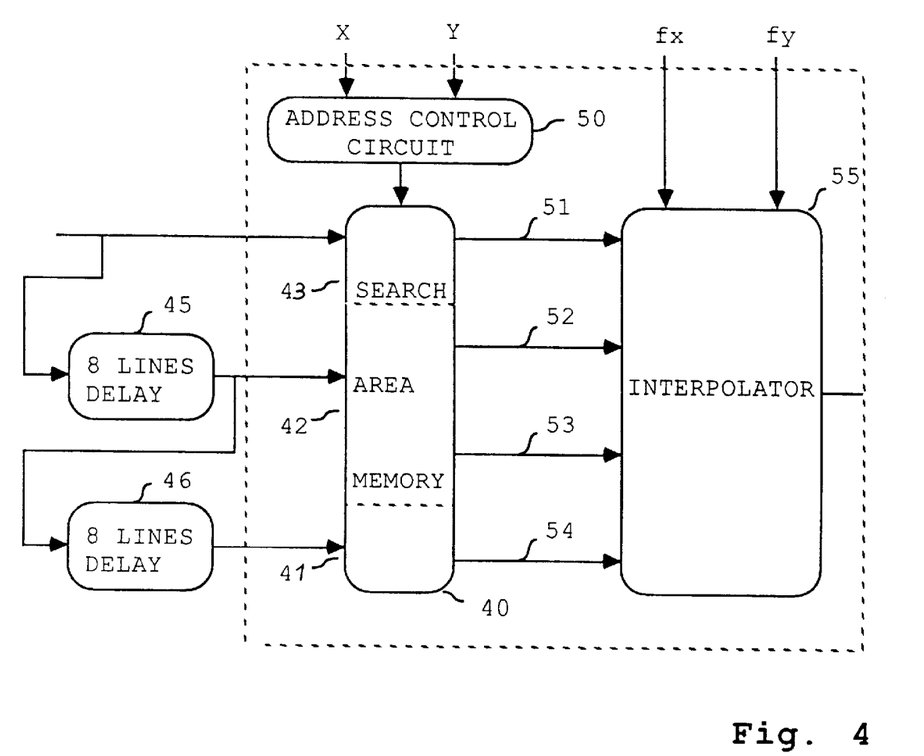
FIG. 4 is a block diagram of a predictor according to the invention.

FIG. 4 shows an exemplary structure that provides this result. This figure shows again the search memory 40 of FIG. 3, the three blocks 41, 42, 43 of which receive information shifted by a few lines from the preceding frame memory (memory 11 of FIG. 1 or memory 31 of FIG. 2). For example, block 43 directly receives the pixels from the preceding frame memory, block 42 receives pixels shifted by m=8 lines through a delay device 45 and block 41 receives these pixels shifted by 8 additional lines from a delay device 46. The search memory is controlled by an addressing control circuit 50 controlled by coordinates X and Y of the integer portion of the motion vector. This memory provides, at the four outputs 51, 52, 53, 54, the four adjacent points of the point addressed by the integer portion of the motion vector and these four outputs are provided to an interpolator 55 controlled by signals fx and fy corresponding to the fractional part of the motion vector. This interpolation circuit, already known, will not be described later on.

The object of the invention more particularly relates to the read/write addressing mode of the search memory allowing the use of a single memory for providing the values of the current image as a function of the preceding image pixels and of the motion vector, at the scanning rate of the system.

Figure 5:
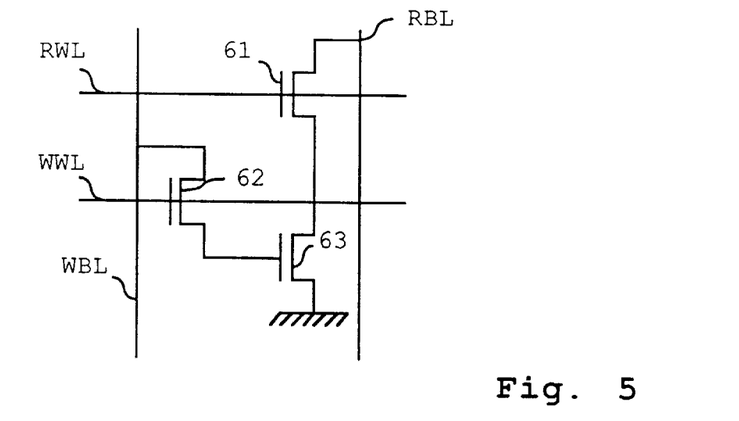
FIG. 5 shows an exemplary elementary cell used in the memory of a predictor according to the invention.

To achieve this purpose, the invention uses a memory, each elementary cell of which is independently addressable in read/write mode. An exemplary elementary cell enabling the achievement of this result is shown in FIG. 5 where three MOS transistors 61, 62 and 63 are shown. Transistors 61 and 63 are connected in series between a read bit line RBL and ground. The gate of transistor 61 is connected to a read word line RWL. The gate of transistor 63 is connected to a write bit line WBL through transistor 62, the gate of which is connected to a write word line WWL.

Figure 6:
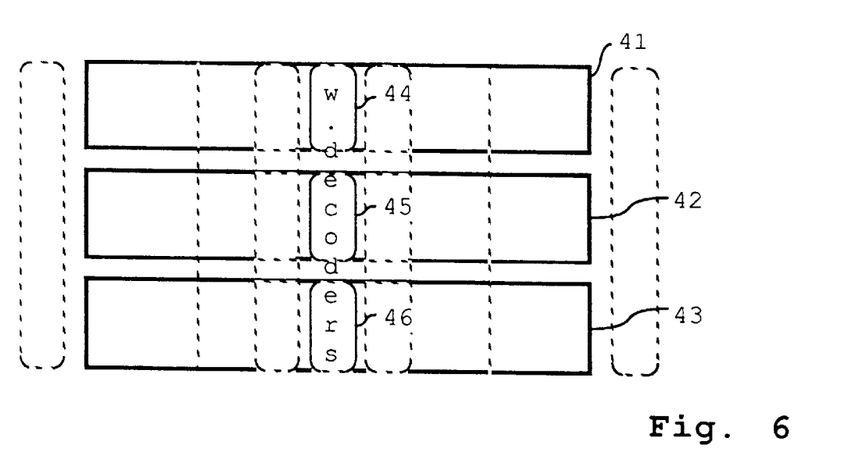
FIG. 6 schematically illustrates the memory of a predictor according to the invention in write mode.

FIG. 6 shows the mathematical arrangement of the single memory according to the invention in the write mode. This memory is divided into the three above-described blocks 41, 42, 43, these three blocks being similarly addressed according to line and column, that is, at a given time, a write mode address is provided at three corresponding points at the same line and column value in these three blocks, respectively.

Figure 7:
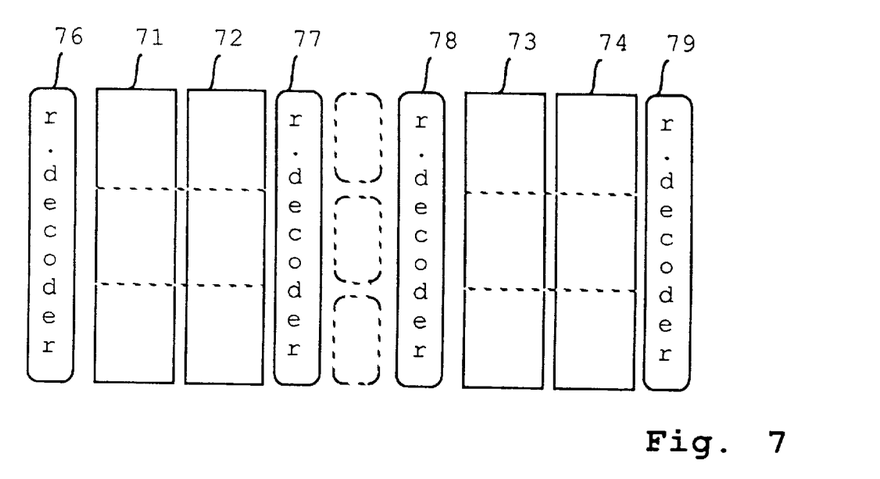
FIG. 7 schematically illustrates the memory of a predictor according to the invention in the read mode.

FIG. 7 illustrates the arrangement of the memory according to the invention in the read mode. Four values corresponding to four points adjacent to the target point are to be simultaneously provided during each clock pulse. Thus, in the read mode, the memory is divided into four blocks 71, 72, 73, 74 and the memory will have been filled so that each of the four adjacent points that it is desired to obtain at a predetermined time each is stored inside a different block (71–74). Examples of appropriate filling modes are indicated later on.

Figure 8:
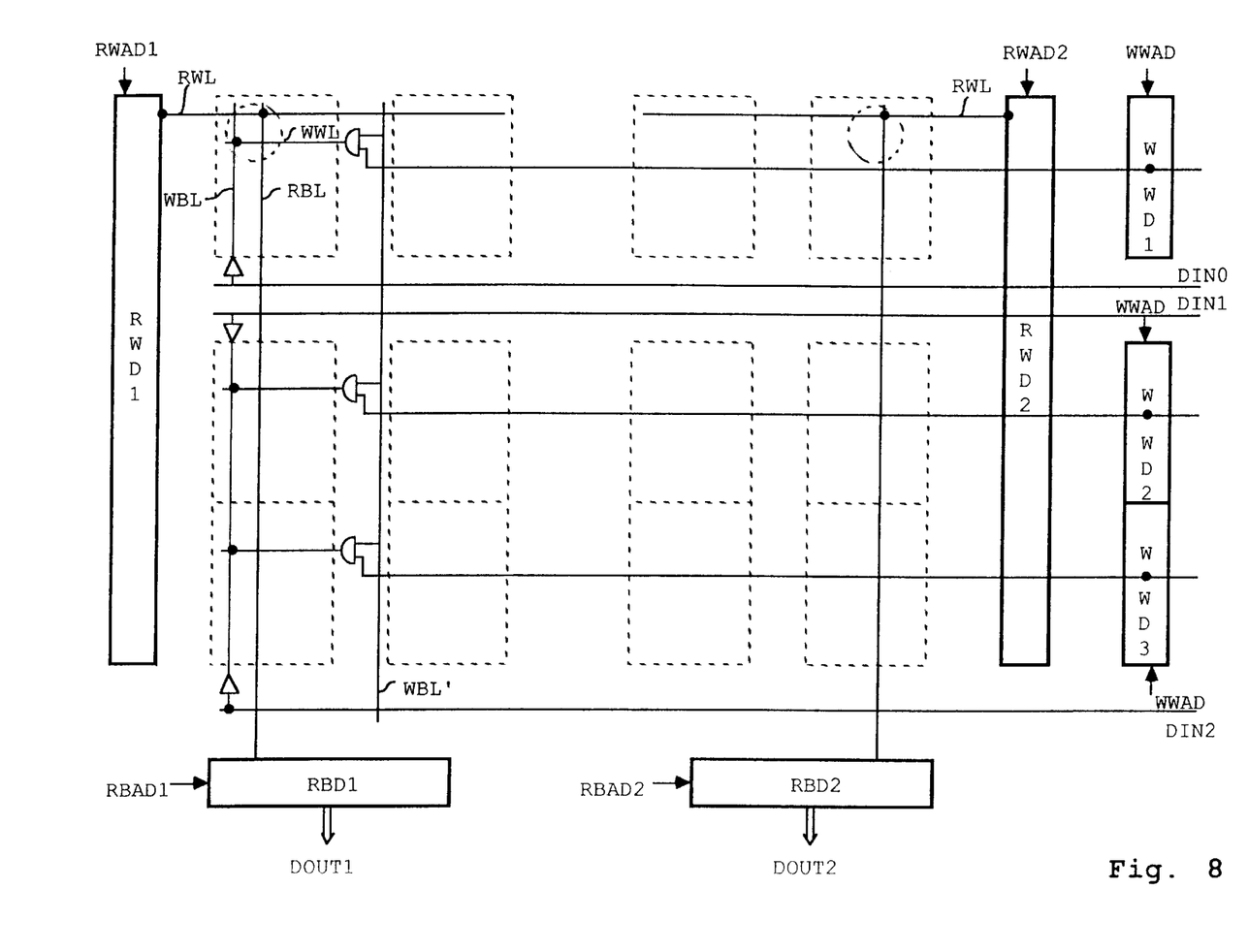
FIG. 8 schematically illustrates an embodiment of the memory of a predictor according to the invention.

FIG. 8 shows in more detail a half-memory according to the invention. The left half portion is illustrated in detail, the circuit being symmetrically repeated on the right. The memory illustrated in FIG. 8 corresponds to the left half of the memories illustrated in FIGS. 6 and 7.

In this figure, frames drawn in dotted lines represent regions containing memory cells of the type shown in FIG. 5. To each memory cell is associated (as above indicated) a read bit line RBL and a read word line RWL as well as a write bit line WBL and a write word line WWL. A read row decoder or read word decoder RWD1 is associated with the left half of the groups of the illustrated memory cells. It enables selecting a read word line RWL. Similarly, a second read word decoder RWD2 is associated with the right half of the illustrated memory cells and selects a read word line RWL. Two additional read word line decoders (not shown) are provided in the right half of the circuit. Similarly, four read column or bit decoders, two of which (RBD1 and RBD2) are shown, enable the selection of a read bit line RBL. Thus, by addressing the four read row decoders and the four read column decoders, it is possible to gain access simultaneously to four memory block cells. Data read at the outputs DOUT1 and DOUT2 of decoders RBD1 and RBD2 are obtained. The four decoders respectively receive row selection addresses RWAD1 and RWAD2 and column selection addresses RBAD1 and RBAD2. The row decoder is normally addressed by the high-weight bits of the read address and the column line decoder is addressed by the low-weight bits of the read column.

In write mode, as indicated above, three parts (represented in the horizontal direction in FIG. 5 of the memory blocks) are simultaneously accessed. This is achieved by means of the write word decoders WWD1, WWD2 and WWD3 providing signals to the corresponding WWL lines. In the preferred embodiment, sub-blocks are selected by a column decoder (not shown) associated with lines WBL'. The data to be introduced are provided on lines DIN0, DIN1, DIN2 connected to the lines WBL. It will be noticed that the three row decoders WWD1, WWD2 and WWD3 receive a same address WWAD.

This arrangement is particularly circuitry-saving as compared to the solution which would have consisted in using 12 independent memories, in which case it would have been necessary to triple the circuitry required for the read bit lines, precharging circuits, column decoders and read amplifiers. Similarly, the write bit decoders are distributed among the various planes of a same bit line. The use of 12 independent memories would involve the increase of these decoders by a factor 4.

More particularly, using 12 independent memories would have required a routing of data and address buses between the memories, which is avoided here since the address buses pass through decoders aligned side by side, and since there is only one read circuit, therefore a single unit of 4 output data buses instead of 12 can be provided. Such an interconnection between separated memories would have occupied a larger silicon surface than the arrangement according to the invention.

Exemplary Application

A writing mode in the memory, and more particularly in the four memory portions 71, 72, 73 and 74, hereafter referenced M0, M1, M2, M3 will be described so that reading can be accomplished as described above.

First, consider the specific case of an image where:
- the block scanning is achieved according to 8-pixel columns,
- with each pixel is associated a luminance byte (Y) and a chrominance byte (C), and
- the luminance byte (Y) and chrominance byte (C) of each pixel are sequentially transmitted.

If the pixels are numbered in the order they arrive, the table representation of the column scanning is as follows:

| Y : | 0  | 16 | 32 | ... |
| C : | 1  | 17 | 33 | ... |
| Y : | 2  | 18 | 34 | ... |
| C : | 3  | 19 | 35 | ... |
| Y : | 4  | 20 | 36 | ... |
| .   | .  | .  | .  |     |
| .   | .  | .  | .  |     |
| .   | .  | .  | .  |     |
| Y : | 12 | 28 | 44 | ... |
| C : | 13 | 29 | 45 | ... |
| Y : | 14 | 30 | 46 | ... |
| C : | 15 | 31 | 47 | ... |

For example, the luminance bytes 0, 16, 2, 18 are adjacent bytes and will be respectively written in memories M0, M1, M2, M3. Since the chrominance bytes are not associated with the luminance bytes, it will be possible to write bytes 1, 17, 3, 19 in the same way in the same memories M0, M1, M2, M3. Therefore, in each memory M0, M1, M2, M3, bytes without any adjacent relationship will be found. The destination of the incoming pixels can be described as shown by the following table:

| Y : | 0 -> M0  | 16 -> M1 | 32 -> M0 | ... |
| C : | 1 -> M0  | 17 -> M1 | 33 -> M0 | ... |
| Y : | 2 -> M2  | 18 -> M3 | 34 -> M2 | ... |
| C : | 3 -> M2  | 19 -> M3 | 35 -> M2 | ... |
| Y : | 4 -> M0  | 20 -> M1 | 36 -> M0 | ... |
| .   | .        | .        | .        | ... |
| .   | .        | .        | .        | ... |
| .   | .        | .        | .        | ... |
| Y : | 12 -> M0 | 28 -> M1 | 44 -> M0 | ... |
| C : | 13 -> M0 | 29 -> M1 | 45 -> M0 | ... |
| Y : | 14 -> M2 | 30 -> M3 | 46 -> M2 | ... |
| C : | 15 -> M2 | 31 -> M3 | 47 -> M2 | ... |

The material representation of the resulting content of the memories is as follows:

| M0 | | M1 | | M2 | | M3 | |
|----|----|----|----|----|----|----|----|
| 0  | 1  | 4  | 5  | 16 | 17 | 20 | 21 | 2 | 3 | 6 | 7 | 18 | 19 | 22 | 23 |
| 8  | 9  | 12 | 13 | 24 | 25 | 28 | 29 | 10 | 11 | 14 | 15 | 26 | 27 | 30 | 31 |
| 32 | 33 | 36 | 45 | 48 | 49 | 52 | 53 | 34 | 35 | 38 | 39 | 50 | 51 | 54 | 55 |
| 40 | 41 | 44 | 45 | 56 | 57 | 60 | 61 | 42 | 43 | 46 | 47 | 58 | 59 | 62 | 63 |
| .  |    | .  |    | .  |    | .  |    |
| .  |    | .  |    | .  |    | .  |    |
| .  |    | .  |    | .  |    | .  |    |

Assume that the motion vector points to byte 28; the four adjacent pixels are 28(M1), 44(M0), 30(M3), 46(M2), and are accessible during the same clock cycle.

The above description applies for the multiplexing mode in which luminance and chrominance occur successively in the following way (considering that lines respectively comprising 64 bytes of blue chrominance (Cb) and 64 bytes of red chrominance (Cr) successively occur):

```
Y, Cb, Y, Cb, . . . . , Y, Cb, Y, Cr, Y, Cr, . . . , Y, Cr, Y, Cb, Y, Cb, ...
<------------128------------>   <-----------128----------->
            bytes                            bytes
```

These bytes must necessarily be stored so as to allow simultaneously accessing, in read mode, to four adjacent pixels. "Adjacent pixels" are the four pixels appearing at (x,y), (x+1, y), (x,y+1), (x+1, y+1) in the above table, on the one hand for luminance and, on the other, for chrominance.

To meet these requirements, the four adjacent bytes must be written in the four memory portions that are simultaneously accessible in read mode, that is, associated with the four read decoders 76–79.

Other modes could be considered:

mode luminance only (mode 2), where there are: either Y with 8 bytes per column, or Y with 16 bytes per column.

mode 4:2:2 (mode 3), where there are:

Y,Cb,Y,Cr, . . . ,Y,Cb,Y,Cr, the mode where luminance and chrominance are multiplexed per blocks (mode 4):

```
Y, Y ..... Y, Cb, Cb ..... Cb, Y, Y ..... Y, Cr, Cr ..... Cr, Y, Y, ...
<----64---->  <----64------->  <----64---->  <----64------->
```

In order to convert these signals in these other modes into the same memory distribution as in the first mode, it is necessary to change the arrival rank (in rank) of the pixel into a value corresponding to its equivalent position in the first mode, with the resulting transformations:

mode 2: 8 bytes per column

```
                   ┌─┬─adjacent─┬─┐
in rank:       0 1 2 3 4 5 6 7  8  9 10 11 12 13 14
modification:  0 2 1 3 4 6 5 7 16 18 17 19 20 22 21
``` mode 2: 16 bytes per column

```
           ┌─┬─adjacent──────────────────────┬─┐
in rank: 0 1 2 3 4 5 6 7 8  9 10 11 12 13 14 15 16 17 18
modif.:  0 2 1 3 4 6 5 7 8 10  9 11 12 14 13 15 16 18 17
``` mode 3:

```
                   ┌─┬─────adjacent──────────────┬─┐
in rank:       0 1 2 3 4 5 6 7 8 9 10 11 12 13 14 15 16 17 18
modif.:    Y:  0   2   4   6   8    10    12    14    16    18
           Cb:   1   3   5       7          9
           Cr:  129  131  133       135
``` mode 4:

```
                       ┌──┬────adjacent─────┬──┐
in rank (Y):       0    1    2    3    4    5  ...  16   17 ...
modification:      0    2    4    6    8   10  ...  32   34 ...
in rank (Cb):     64   65   66   67   68   69  ...  80   81 ...
modification:      1    3    5    7    9   11  ...  33   35 ...

in rank (Y):     128  129  130  131  132  133  ... 144  145 ...
modification:    128  130  132  134  136  138  ... 288  290 ...

in rank (Cr):    192  193  194  195  196  197  ... 208  209 ...
modification:    129  131  133  135  137  139  ... 289  291 ...
```

The above tables are only preferred examples for the filling of the search memory. One skilled in the art can find other ways to store information relating to four adjacent pixels into four memory positions wherein the stored positions are simultaneously addressable in read mode.

What is claimed is:

1. An image predictor for providing at least one target pixel in a preceding image, the preceding image being represented by a plurality of pixels, the at least one target pixel corresponding to a pixel in a current image shifted by a motion vector, the image predictor comprising:

a search memory comprising a plurality of memory cells each independently addressable in a read mode and a write mode;

a plurality of read decoders that arrange the memory cells into a corresponding plurality of simultaneously and independently readable blocks;

a write control circuit that writes data to the search memory that represents the plurality of pixels of the preceding image;

a plurality of write decoders that arrange the memory cells into a plurality of independently writable blocks, each of the plurality of independently writable blocks sharing at least one memory cell with each of the plurality of simultaneously and independently readable blocks, the plurality of write decoders arranging the memory cells so that when the data representing the plurality of pixels of the preceding image is written to the search memory, each one of said plurality of pixels is stored within a separate readable block from its adjacent pixels; and a read control circuit that reads data from at least one memory cell, selected in response to the motion vector, that represents the at least one target pixel.

2. The image predictor of claim 1, wherein the data written to the search memory that represents the plurality of pixels of the preceding image is written to a number of memory cells that is determined by an estimated maximum value of a magnitude and a direction of the motion vector.

3. The image predictor of claim 2, wherein the write control circuit activates three first predetermined portions of the search memory to store the data representing the plurality of pixels of the preceding image.

4. The image predictor of claim 2, wherein the write control circuit controls the plurality of write decoders so that n successive write operations of a same type of data corresponding to n adjacent pixels of the preceding image respectively store the corresponding data in n first predetermined portions of the search memory.

5. The image predictor of claim 4, further comprising circuitry that writes:

data representing the preceding image into a first activated portion of the search memory, data representing the preceding image shifted by a first predetermined time delay into a second activated portion of the search memory, and data representing the preceding image shifted by a second predetermined time delay into a third activated portion of the search memory.

6. The image predictor of claim 5, wherein data representing the preceding image, the preceding image shifted by the first predetermined time delay, and the preceding image shifted by the second predetermined time delay is stored in respectively corresponding locations in each of the first, second, and third activated portions of the search memory.

7. The image predictor of claim 6, wherein the read control circuit controls p read decoders to read data from p memory cells of the search memory, the p memory cells storing data representing p adjacent target pixels.

8. The image predictor of claim 7, wherein the write control circuit controls the write decoders to simultaneously activate each of the first predetermined portions of the search memory.

9. The image predictor of claim 8, wherein the read control circuit controls the read decoders to simultaneously activate each of the p memory cells of the search memory, each of the p memory cells being within a different readable block.

10. The image predictor of claim 9, further comprising an interpolator, coupled to the read decoders, for interpolating the data from each of the p memory cells to provide a single target pixel for the corresponding pixel in the current image.

11. The image predictor of claim 10, wherein eight words of target pixels are provided.

12. The image predictor of claim 10, wherein sixteen words of target pixels are provided.

13. The image predictor of claim 10, wherein the data read from the memory cells is luminance data.

14. The image predictor of claim 10, wherein the data read from the memory cells is chrominane data.

15. The image predictor of claim 1, wherein the search memory consists of a single memory.

16. An image predictor for providing at least one target pixel in a preceding image, the preceding image being represented by a plurality of pixels, the at least one target pixel corresponding to a pixel in a current image shifted by a motion vector, the image predictor comprising:

a search memory including a plurality of memory cells each independently addressable in a read mode and a write mode;

means for arranging the memory cells into a plurality of simultaneously and independently readable blocks;

writing means for arranging the memory cells into a plurality of independently writable blocks that each shares at least one memory cell with each of the plurality of simultaneously and independently readable blocks, and for writing data that represents the plurality of pixels of the preceding image to the plurality of independently writable blocks such that each pixel is stored within a separate readable block from its adjacent pixels; and reading means, responsive to the motion vector, for reading data from p memory cells that represent p adjacent target pixels of the preceding image, the p memory cells each being within a different readable block.

17. The image predictor of claim 16, wherein the writing means includes means for writing the data that represents the plurality of pixels of the preceding image to a number of memory cells that is determined by an estimated maximum value of a magnitude and a direction of the motion vector.

18. The image predictor of claim 17, wherein the writing means includes means for performing n successive write operations of a same type of data, corresponding to n adjacent points in an image, to n first predetermined portions of the search memory.

19. The image predictor of claim 18, wherein the writing means further includes partitioning means for entering:

data from the preceding image into a first activated portion of the search memory, data from the preceding image shifted by a first predetermined time delay into a second activated portion of the search memory, and data from the preceding image shifted by a second predetermined time delay into a third activated portion.

20. The image predictor of claim 19, wherein the writing means enters corresponding data from each of the preceding image, the preceding image shifted by the first predetermined time delay and the preceding image shifted by the second predetermined time delay in respectively corresponding locations in each of the first, second, and third activated portions of the search memory.

21. The image predictor of claim 20, wherein the writing means further comprises means for simultaneously activating each of the first predetermined portions of the search memory.

22. The image predictor of claim 21, further comprising an interpolation means, coupled to the reading means, for interpolating the data from each of the p memory cells to provide a single target pixel for the corresponding pixel in the current image.

23. The image predictor of claim 16, wherein the search memory consists of a single memory.

24. In an image predictor that provides at least one target pixel in a preceding image corresponding to a pixel in a current image shifted by a predetermined motion vector, a method of controlling a search memory having a plurality of memory cells that are independently addressable in a read mode and a write mode, the preceding image being represented by a plurality of pixels, the method comprising the steps of:

a. arranging the memory cells into a plurality of simultaneously and independently readable blocks and into a plurality of independently writable blocks, each of the plurality of independently writable blocks sharing at least one memory cell with each of the plurality of simultaneously and independently readable blocks;

b. writing data that represents the plurality of pixels of the preceding image to the writable blocks such that each one of the plurality of pixels is stored within a separate readable block from its adjacent pixels; and c. reading data from p memory cells within different readable blocks selected in response to the motion vector, the data from the p memory cells representing p adjacent target pixels of the preceding image.

25. The method of claim 24, wherein step b includes writing data to a number of memory cells based upon an estimated maximum value of a magnitude and direction of the motion vector.

26. The method of claim 25, wherein step b includes a step of entering data into the search memory so that n successive write operations of a same type of data corresponding to n adjacent points in an image respectively store the data in n first predetermined portions of the search memory.

27. The method of claim 26, wherein step b further includes a step of entering data from the preceding image into a first activated portion of the search memory, entering data from the preceding image shifted by a first predetermined time delay into a second activated portion of the search memory, and entering data from the preceding image shifted by a second predetermined time delay into a third activated portion of the search memory.

28. The method of claim 27, wherein the step of entering data into each of the first, second, and third activated portions includes entering corresponding data from each of the preceding image, the preceding image shifted by the first predetermined time delay, and the preceding image shifted by the second predetermined time delay into respectively corresponding locations in each of the first, second, and third activated portions.

29. The method of claim 24, further comprising a step of interpolating the data from each of the p memory cells to provide a single target pixel for the corresponding pixel in the current image.

30. The method of claim 24, wherein step a includes arranging the memory cells of a single search memory.

31. An image encoder, comprising:
  means for receiving a current image signal;
  means, responsive to the means for receiving, for encoding the current image signal to provide a transmission signal;
  means, responsive to the means for encoding, for comparing the current image signal with a preceding image signal and providing a target signal to the means for encoding;
  means, responsive to the means for comparing and the means for receiving, for calculating a motion vector;
  wherein the means for comparing further comprises an image predictor that provides a target signal comprising a set of target pixels in the preceding image signal, the preceding image signal being represented by a plurality of pixels, the set of target pixels corresponding to a set of pixels in the current image signal shifted by the motion vector, the image predictor comprising:
    a search memory comprising a plurality of memory cells each independently addressable in a read mode and a write mode;
    p read decoders that arrange the memory cells into p simultaneously and independently readable blocks;
    a write control circuit that writes data to the search memory that represents the plurality of pixels of the preceding image signal;
    a plurality of write decoders that arrange the memory cells into a plurality of independently writable blocks, each of the plurality of independently writable blocks including at least one memory cell included within each of the p simultaneously and independently readable blocks, the plurality of write decoders arranging the memory cells so that when the data representing the plurality of pixels of the preceding image is written to the search memory, each one of the plurality of pixels is stored within a separate readable block from its adjacent pixels;
    a read control circuit that reads data from a group of memory cells, selected in response to the motion vector, that represents p target pixels for each of the set of pixels in the current image signal; and
    an interpolator, coupled to the read decoders, that generates the target signal by interpolating the p target pixels corresponding to each of the set of pixels in the current image signal to generate a single target pixel for each of the set of pixels in the current image signal.

32. The image encoder of claim 31, wherein the search memory consists of a single memory.

33. An image decoder, comprising:
  means for receiving a current image signal;
  means, responsive to the means for receiving, for decoding the current image signal to provide a received signal;
  means, responsive to the means for decoding, for comparing the current image signal with a preceding image signal to provide a target signal to the means for decoding;
  wherein the means for comparing further comprises an image predictor that provides a set of target pixels in the preceding image, the preceding image being represented by a plurality of pixels, the set of target pixels corresponding to a set of pixels in the current image shifted by a motion vector, the image predictor comprising:
    a search memory comprising a plurality of memory cells each independently addressable in a read mode and a write mode;
    p read decoders that arrange the memory cells into p simultaneously and independently readable blocks;
    a write control circuit that writes data to the search memory that represents the plurality of pixels of the preceding image signal;
    a plurality of write decoders that arrange the memory cells into a plurality of independently writable blocks, each of the plurality of independently writable blocks including at least one memory cell included within each of the p simultaneously and independently readable blocks, the plurality of write decoders arranging the memory cells so that when the data representing the plurality of pixels of the preceding image is written to the search memory, each one of the plurality of pixels is stored within a separate readable block from its adjacent pixels;
    a read control circuit that reads data from a group of memory cells, selected in response to the motion vector, that represents p target pixels for each of the set of pixels in the current image signal; and
    an interpolator, coupled to the read decoders, that interpolates the p target pixels corresponding to each of the set of pixels in the current image signal to generate a single target pixel for each of the set of pixels in the current image signal.

34. The image decider of claim 33, wherein the search memory consists of a single memory.

35. A method of organizing a search memory in an image predictor, the image predictor providing a set of target pixels of a preceding image corresponding to a set of pixels in a current image shifted by a motion vector, the search memory having a plurality of memory cells that stores a plurality of pixels representative of the preceding image, the method comprising the steps of:
  providing a plurality of read decoders that arrange the search memory into a corresponding plurality of simultaneously and independently readable blocks of memory cells;
  providing a plurality of write decoders that arrange the search memory into a corresponding plurality of independently writable blocks of memory cells that each shares at least one memory cell with each of the plurality of simultaneously and independently readable blocks;
  storing the plurality of pixels representative of the preceding image into the plurality of independently writable blocks such that each pixel is stored within a separate readable block from its adjacent pixels.

36. The method of claim 35, wherein the search memory consists of a single memory.

* * * * *